United States Patent [19]

D'Alessandro

[11] 4,446,680
[45] May 8, 1984

[54] BATTERY POWERED LAWN EDGER

[76] Inventor: Thomas C. D'Alessandro, 7410 W. Lake Dr., West Palm Beach, Fla. 33404

[21] Appl. No.: 371,558

[22] Filed: Apr. 26, 1982

[51] Int. Cl.³ .................... A01D 69/02; A01D 53/14
[52] U.S. Cl. ........................................ 56/11.9; 56/256
[58] Field of Search ................. 56/11.9, 256; 172/13–18

[56] References Cited

U.S. PATENT DOCUMENTS

| | | | |
|---|---|---|---|
| 2,410,196 | 10/1946 | Banthall, Sr. | 56/256 |
| 2,597,735 | 5/1952 | Jepson | 56/10.5 |
| 2,690,636 | 10/1954 | Besse et al. | 56/256 |
| 2,739,437 | 3/1956 | True | 56/256 |
| 2,909,885 | 10/1959 | Smith | 56/11.9 |
| 3,212,244 | 10/1965 | Wilgus | 56/11.9 |
| 3,537,244 | 11/1970 | Hicks | 56/256 |
| 3,581,480 | 6/1971 | O'Connor | 56/11.9 |
| 3,587,749 | 6/1971 | Sauer | 56/256 |
| 3,676,989 | 7/1972 | Slayton | 56/11.9 |
| 3,782,085 | 1/1974 | Parker et al. | 56/256 |
| 3,841,069 | 10/1974 | Weck | 56/11.9 |

*Primary Examiner*—Paul J. Hirsch
*Attorney, Agent, or Firm*—Eugene F. Malin

[57] ABSTRACT

A self-contained battery-energized, cordless lawn edger. This device includes a frame supported on at least three wheels which frame securely carries, for example, one or more rechargeable wet-cell batteries as well as a pivotally mounted sub-assembly having a heavy-duty series wound drive motor, a rigid edger blade mounted on the drive motor output shaft and a blade guard. Recharging may be accomplished by interconnection to a conventional automotive charging system, a battery charger, or to a 115 V.A.C. power source. The blade is positioned to rotate in a plane generally perpendicular to the ground. A blade positioning lever is pivotably attached to the main guide handle for vertical positioning of the blade. A drive motor on-off switch attached to the handles is also provided. A removable cover may also be provided for protecting the battery energizers. One or more of the wheels may also include drive means.

1 Claim, 3 Drawing Figures

BATTERY POWERED LAWN EDGER

BACKGROUND

This invention relates generally to lawn edgers and particularly to a commercial battery-powered cordless self-supporting lawn edger. Previous lawn edgers which have been electrically powered were supplied with municiple power by extension cord, carrying with them all of the well-known hazards such as cord severing by the blade itself or electrocution of the operator when improperly grounded or worn devices encounter water. These previous rechargeable cordless trimmers, such as in U.S. Pat. No. 4,237,610, were not sufficiently powerful to drive a heavy rigid edger blade through previously ill-kept lawns which might require removal of grass and soil over the walk, curb or driveway in excess of one inch thickness.

Internal combustion engines have also been used as a power source for heavy-duty lawn edgers, but noise, fumes, fuel cost and the like have rendered these devices objectionable in commercial residential lawn care.

The instant invention overcomes the above limitations of commercial lawn edgers by providing a wet-cell battery powered self-supporting edger having a modified heavy-duty series wound drive motor. Inherently provided are the features of quietness, rechargeability, and substantial stored electrical power, even at lower motor speeds.

BRIEF DESCRIPTION OF THE INVENTION

An improved self-supported rollable lawn edger powered by rechargeable d.c. power supply such as wet-cell storage batteries and having means for vertical positioning of the rigid blade, blade shield and drive motor as a sub-unit. This sub-unit is pivotally mounted at the front of the frame or chassis to allow the blade positioning lever, mounted on the main guide handle to raise and lower the cutting blade relative to the ground. At least three wheels support the frame and allow this device to be manually propelled by the main guide handle. Alternately, drive means may be included with one or more wheels to propel the device, also powered by the d.c. power storage means. A power on-off switch is also attached to the main guide handle to start and stop the blade/drive motor. A removable cover for the electrical power storage means also may be provided for protecting and shielding the storage means from debris and inadvertent contact with other grounded objects.

It is an object of this invention to provide a self-contained battery powered, self-supporting commercial lawn edger.

It is another object of this invention to provide a commercial lawn edger which functions without any associated obnoxious noise.

It is yet another object of this invention to provide a cordless commercial lawn edger having sufficient power to handle all types and conditions of lawn edging tasks.

It is still another object of this invention to provide an integral rechargeable electrical power supply for driving a rigid-blade heavy-duty lawn edger.

In accordance with these and other objects which will be apparent hereinafter, the instant invention will now be described with particular reference to the accompanying drawings.

PREFERRED EMBODIMENT OF THE INVENTION

Figure 2:
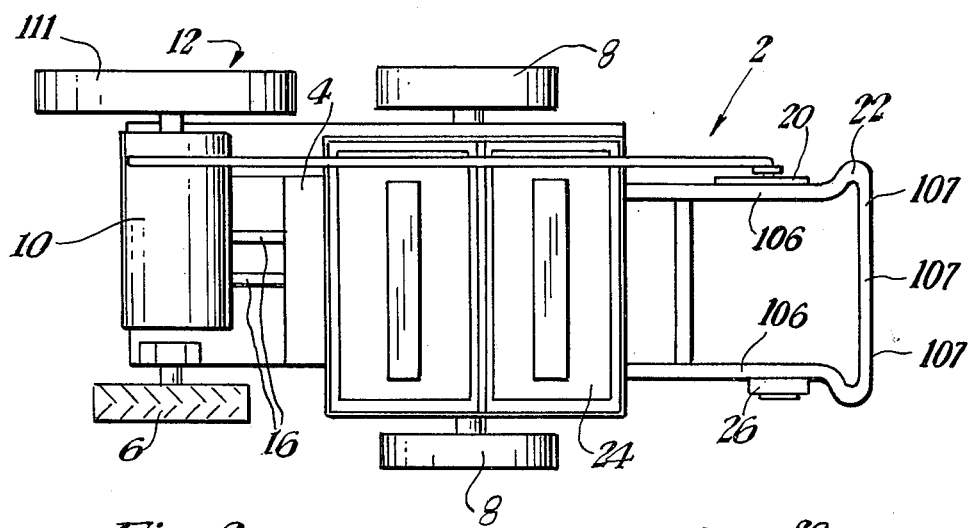
FIG. 2 is a plan view of the invention.
Figure 1:
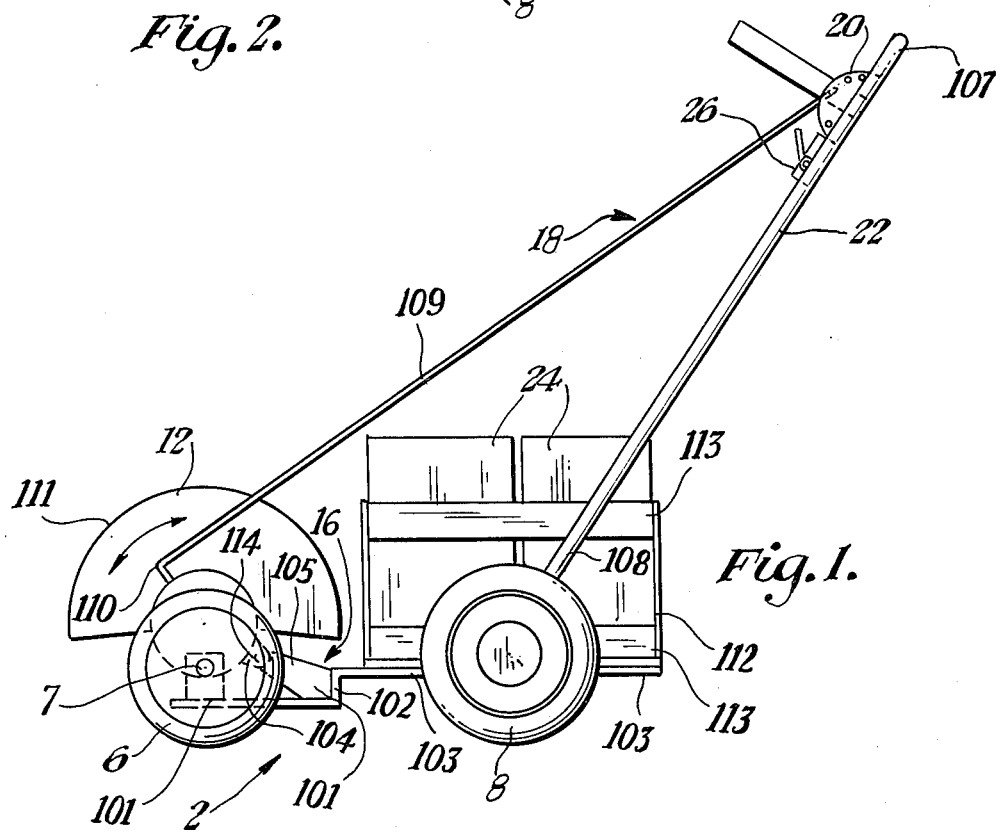
FIG. 1 is a right side elevation view of the invention.

Referring now to the drawings and firstly to FIGS. 1 and 2, the invention is shown generally at 2 and includes a frame supported by front wheel 6 rotatably mounted thereon at 7 and side wheels 8 also attached thereto. The frame carries two 12-volt wet-cell storage batteries 24, wired in series to produce a 24-volt power supply to a specially heavy duty series wound drive motor 10. The drive motor is pivotally mounted at 15 onto the front of the frame at 16. A rigid lawn edging blade 14 is mounted onto the output shaft of the drive motor, positioned to rotate in a plane approximately perpendicular to the surface of the lawn to be edged. The horizontal axis of wheel 6 and of the drive shaft are as shown in the drawing in the same vertical plane and are parallel to each other. A blade guard 12 mounted onto the end of the drive motor shields the operator, bystanders and nearby property from flying stones and debris torn loose by the rotating blade.

Figure 3:
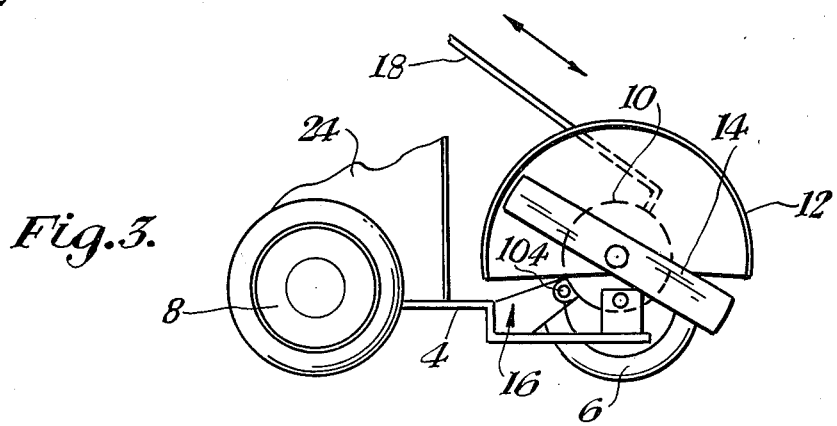
FIG. 3 is a partial left-side elevation view of the invention with the front wheel removed.

A main guide handle 22 attached to the frame at an acute angle to the ground provides operator manual control and movement means for the device. Although shown in the preferred embodiment as rigidly fixed in relation to the frame, the main guide handle may also be pivotable about the point of attachment to the frame to provide versatility in accomodating a wider range of operator heights. Also pivotally attached near the distal end of the main handle is a blade positioning lever 20 which is interconnected to the drive motor by blade positioning rod 18. Also now referring to FIG. 3, as blade positioning lever 20 is actuated, rod 18 pivotally positions the drive motor 10 about pivot mount 16 in direction A. This movement effectuates the degree of engagement or disengagement of the rigid blade to the lawn to be edged. An on-off control switch 26 serves as electrical interconnection between the power storage means and the drive motor to stop. A removable battery cover (not shown) shields batteries 24 from debris and accidental terminal contact with foreign grounded objects. Although not shown wheel conventional drive means, powered by the storage batteries, may also be included to propel the device.

By reference to all three drawing figures, it can be seen that the frame is divided into a first flat plate portion 101 and a third flat plate portion 103 connected by a second flat plate portion 102. Member 16 is subdivided into two further members, a first elongated mounting member 104, and a second elongated mounting member 105. Connecting these two members is a pivotal connection 114. Member 22 has distal portions 107, 108, member 107 being free-standing, and member 108 being attached to the frame. Member 18 is subdivided into portions 109, 110, elongated portion 109 extends from handle 20 to a right angle bend 110. Blade guard 12 has about its circular perimeter a hemispherical rim. The rim extends horizontally, and is generally perpendicular to the blade guard proper. Batteries 24 are mounted within receptacle 112. The receptacle comprises ferrules 113.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. A lawn edger comprising:

a frame, said frame comprising a unitary plate, said unitary plate having a first flat plate portion and a third flat plate portion disposed in different horizontal planes, said first flat plate portion being nearer to the ground than said third flat plate portion, and a second flat plate portion disposed in a vertical plane, said second flat plate portion connecting said first and said third flat plate portions into said unitary plate, a motor including an output drive shaft horizontally mounted on said frame, said motor being d.c. wound, ground engaging means for transporting said frame, said ground engaging means being mounted on said frame, said ground engaging means comprising at least three wheels, the axis of rotation of a first of said wheels and said drive shaft being substantially parallel and in substantially the same vertical plane, the other two of said wheels being rearward of said first of said wheels and mounted for rotation on a horizontally disposed axle, said axle being ridigly mounted on said third flat plate portion of said frame, means pivotally mounted on said motor to said frame for movement about a horizontal axis, said means pivotally mounted comprising first and second elongated mounting members, each said first and second elongated mounting member having first and second planar members, each said first planar member being rigidly attached to said motor, each said second planar member being rigidly attached to said second flat plate portion of said frame, each said first and second planar member of each said first and second elongated member being pivotally connected to one another, whereby to pivotally mount said motor to said frame, a rigid lawn-edging blade mounted at one end of said shaft for rotation about a horizontal axis for effecting vertical cutting engagement with an overgrown lawn, a handle connected to said frame mounted for engagement by an operator, said handle being one or more poles attached to said frame having a freestanding end for gripping by an operator of said lawn edger, and an end attached to said frame, means mounted on said handle for effecting pivotal movement of said motor for raising and lowering said blade with respect to the ground, said means for effecting pivotal movement comprises a hand crank and a rigid link having an elongated portion extending from said free-standing end of said handle substantially to said motor, said rigid link having a right angle bend portion extending from said elongated portion of said rigid link to said motor, and being rigidly attached to said motor for rotational cranking said motor in a vertical plane responsive to the movement of said crank, a source of electrical energy mounted on and supported by said frame, said source of electrical energy being one or more d.c. storage batteries mounted on said third flat plate portion of said frame, said one or more batteries electrically connected to said motor to run said motor and rotate said blade, switch means electrically connecting said source of electrical energy to said motor in electrical series for turning said motor off and on, a substantially semi-circular blade guard vertically mounted adjacent said blade, said guard having a horizontally extending rim extending about the circular periphery of said semi-circular blade guard, and a receptacle for said batteries rigidly mounted to said third flat plate portion of said frame, said receptacle comprising at least two horizontally disposed ferrules surrounding said batteries.

* * * * *